United States Patent [19]

Jang et al.

[11] Patent Number: 5,056,755
[45] Date of Patent: Oct. 15, 1991

[54] GATE VALVE

[76] Inventors: Young H. Jang, Apartado Postal 7902, Panama 9, Panama; Joseph A. Francisco, 2268 Caminito Pescado #29, San Diego, Calif. 92107

[21] Appl. No.: 558,229
[22] Filed: Jul. 26, 1990
[51] Int. Cl.$^5$ ............................................. F16L 29/00
[52] U.S. Cl. ...................................... 251/148; 285/31; 285/337; 285/348; 251/329
[58] Field of Search ............... 251/148, 329, 327, 326; 285/31, 337, 348, 345, 342

[56] References Cited

U.S. PATENT DOCUMENTS

| 2,850,299 | 9/1958 | Risley | 285/348 X |
| 3,829,061 | 8/1974 | Dayne et al. | 251/329 X |
| 4,878,698 | 11/1989 | Gilchrist | 285/342 |

FOREIGN PATENT DOCUMENTS

| 1229908 | 12/1961 | France | 251/148 |
| 1489083 | 10/1977 | United Kingdom | 251/148 |

Primary Examiner—Martin P. Schwadron
Assistant Examiner—Kevin Lee

[57] ABSTRACT

A valve is disclosed herein having an open-ended passageway with a movable gate inbetween its opposite ends for selectively opening and closing the passageway. The opposite valve ends defining the passageway include a threaded fitting or cap carried on a valve body defining a tapered gland occupied by a frustro-conical resilient seal cooperating with the gland to seal between a conduit and the valve body. The valve body is adapted for installation in a situation joining opposing ends of separated conduit or pipes.

1 Claim, 1 Drawing Sheet 5,056,755

GATE VALVE

BACKGROUND OF THE INVENTION

1. Field of the Invention

The present invention relates to the field of valves, and more particularly to a novel valve adapted to be interposed between two conduit ends in a sealing relationship and which includes an improved sealing gland forming a fluid tight joint with the conduit ends.

2. Brief Description of the Prior Art

In the plumbing and piping industry, it is common practice to place a conduit or a pipe between other plumbing components such as elbow joints so that a liquid passageway is established between the components. Subsequent to installation, it is sometimes required that a valve or other hardware be placed in the conduit so that control of the liquid is established. Usually, the entire conduit must be disassembled from the components and a new conduit is installed with the necessary valve already incorporated into the conduit system.

Although such a procedure is operative, the expense is great and a great deal of time is required to disassemble the previous installation and to assemble a new conduit and valve combination.

Therefore, a long-standing need has existed to provide a means for modifying an existing conduit installation so as to receive a plumbing component such as a gate valve without the necessity of completely disassembling the original installation. Such a means would include modification of a valve body so as to include a sealing means so that after modification, the original system will be leakproof and watertight.

SUMMARY OF THE INVENTION

Accordingly, the above problems and difficulties are obviated by the present invention which provides a novel valve suitable for installation in a previously installed plumbing system having a conduit wherein the conduit is severed so as to provide two opposing conduit ends and wherein the ends are slidably inserted into opposite sides of the valve body for a sealing attachment therewith. The valve body includes opposing ends threadably adapted to receive end caps or fittings and wherein each end of the valve body, in cooperation with the end cap or fitting, defines a tapered gland into which a frustro-conical seal is placed in order to provide watertight and fluid-tight engagement with the conduit ends.

Therefore, it is among the primary objects of the present invention to provide a novel method and apparatus for joining a pair of opposing conduit ends together so that a plumbing component, such as a gate valve, may be placed between the opposing ends in fluid-tight relationship.

Another object of the present invention is to provide a novel sealing gland on opposite ends of a valve body adapted to engage in fluid-tight relationship with pipe or conduit ends such that a frustro-conical seal is employed to achieve the relationship.

Yet another object of the present invention is to provide an economic and reduced-time installation for modifying a pipe or conduit system to incorporate a plumbing component such as a gate valve into a previously installed system.

Yet another object of the present invention is to provide a novel means for introducing a plumbing component into a pipe or conduit system that has been previously installed which not only saves time but does not require special equipment or tools to provide either the modification or subsequent installation.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
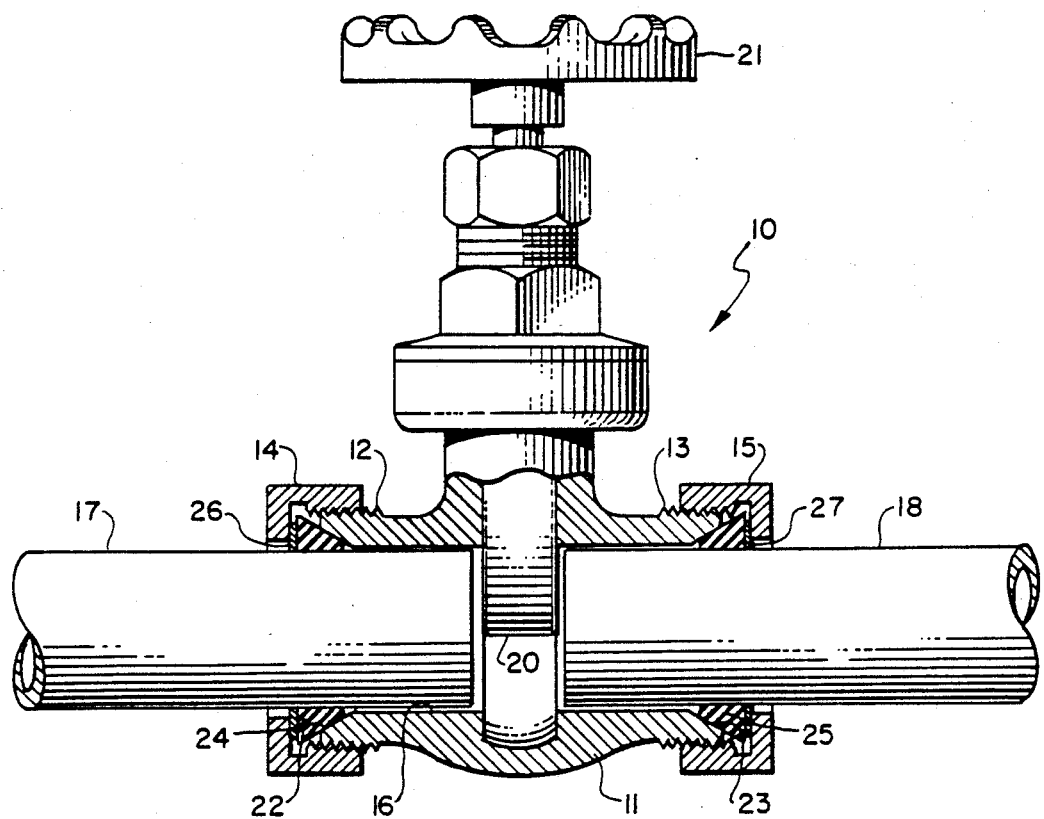
FIG. 1 is a sectional view showing the novel gate valve of the present invention for joining opposing conduit or pipe ends together.

Referring to FIG. 1, the novel gate valve of the present invention is illustrated in the general direction of arrow 10 which includes a valve body 11 having opposite ends 12 and 13 that are provided with external threads in order to receive internal threads from end caps or fittings 14 and 15 respectively. It can be seen that the body 11 includes an open-ended elongated passageway 16 which is intended to receive opposing ends of conduit or pipe, illustrated by numerals 17 and 18 respectively. The opposite and opposing ends of conduits 17 and 18 are in spaced-apart relationship so that a gate 20 may be interposed through the passageway 16 in order to control a fluid passing therethrough. The gate 20 moves up and down in a vertical movement in response to rotary turning of valve handle 21 as is the conventional practice. The present invention is not intended to cover the mechanism for moving the gate 20 and any conventional gate valve system is applicable for practicing the present invention.

However, it is important to note that ends 12 and 13 of body 11 provide a tapered valve seat indicated by numerals 22 and 23 respectively. It is also noted that although the seat is tapered, it is also annular and that a frustro-conical seal, indicated by numerals 24 and 25, is disposed against the annular tapered surface. The area occupied by the seals 24 and 25 constitute a gland and the seal is of a resilient composition so as to bear against the tapered annular surface at the body ends as well as against the exterior surface of the conduit ends 17 and 18. To complete the sealing arrangement, disc washers, indicated by numerals 26 and 27, are disposed between the back end or wall of each seal 22 and 23 and are engaged by annular shoulders provided on the end caps or fittings 14 and 15 so that as the end caps or fittings are tightened, the seals 24 and 25 will be forcibly urged into the gland against the tapered surfaces 22 and 23.

Figure 2:
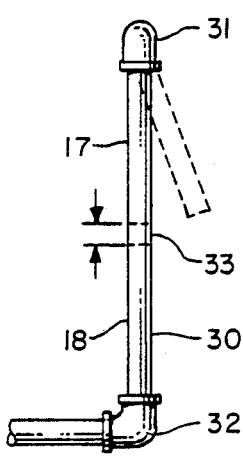
FIG. 2 is a reduced view of a plumbing system showing a previously installed pipe preparatory for modification.
Figure 3:
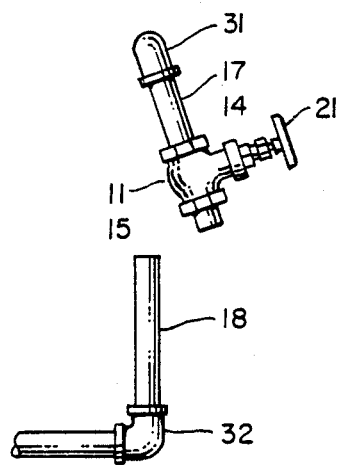
FIG. 3 is a view similar to the view of FIG. 2 illustrating modification of the conduit system with a gate valve preparatory for sealing the opposing conduit ends together.
Figure 4:
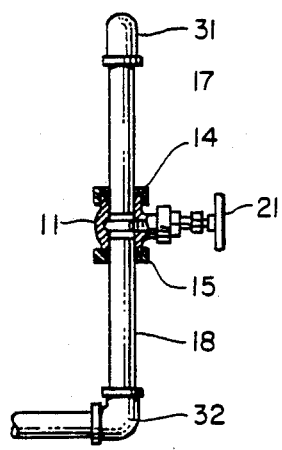
FIG. 4 is a view similar to views 2 and 3 illustrating the novel gate valve in its installed location.

With respect to installation, FIG. 2 illustrates a conventional piping system wherein a length of conduit or pipe 30 is disposed between elbow joints 31 and 32. When it is desired to incorporate a gate valve in the conduit 30, it is necessary to cut the conduit 30 and remove a portion, indicated by numeral 33, so that the opposing ends 17 and 18 remain. Next, the elbow 31 is rotated so that the conduit 17 is in the position shown in broken lines. At this time, reference is made to FIG. 3 wherein conduit 17 is introduced into the passageway 16 of the body 11. The valve body is pushed upwardly on the conduit or pipe 17 and, referring now to FIG. 4, the pipe 17 may be rotated via elbow 31 to be in line with the pipe 18 so that the valve body 11 can be placed over the opposing end of conduit 18. At this time, the end caps or fittings 14 and 15 are tightened so that the opposite ends of the valve body are in sealing engagement with the opposing ends of the conduits 17 and 18. At this time, the valve handle 21 may be operated to move the gate 20 so as to control fluid conducted through the conduits.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a gate valve for installation between opposing ends of conduits, the improvement which comprises the combination of:
   a body having a continuous open-ended passageway of constant diameter extending between integral opposite externally threaded ends;
   said passageway diameter being larger than the outside diameter of said conduits;
   each passageway end opening adapted to insertably receive a conduit so that said conduits are in spaced-apart relationship lying on the same central longitudinal axis within said passageway of larger diameter;
   each passageway end opening terminating in a tapered surface;
   end caps threadably carried on each of said threaded body ends and having an annular flange coaxially disposed with respect to said conduits cooperating with said tapered surface to define a sealing gland;
   a frusto-conical resilient seal occupying said gland in compression between said flange and said tapered surface to seal said gland;
   annular retaining washers disposed between each annular flange and each resilient seal;
   a movable gate operably carried on said body for positioning between the opposing conduits to control fluid through said passageway; and
   said frusto-conical seal includes a tapered sealing surface in abutting engagement with said tapered body end surface.

* * * * *